United States Patent [19]

Bayle-Laboure et al.

[11] Patent Number: 4,766,722
[45] Date of Patent: Aug. 30, 1988

[54] ENLARGED BOWL MEMBER FOR A TURBOJET ENGINE COMBUSTION CHAMBER

[75] Inventors: Gerard J. P. Bayle-Laboure, Avon; Michel A. A. Desaulty, Vert Saint Denis; Jérome Perigne, Vaux le Peinl; Denis J. M. Sandelis, Nangis, all of France

[73] Assignee: Societe Nationale d'Etude et de Construction de Moteurs d'Aviation (SNECMA), Paris, France

[21] Appl. No.: 890,474

[22] Filed: Jul. 30, 1986

[30] Foreign Application Priority Data

Aug. 2, 1985 [FR] France ................................ 85.11842

[51] Int. Cl.⁴ .............................................. F02C 3/14
[52] U.S. Cl. .................................... 60/39.23; 60/752; 60/757
[58] Field of Search ..................... 60/39.23, 755, 756, 60/757, 748, 752

[56] References Cited

U.S. PATENT DOCUMENTS

| | | | |
|---|---|---|---|
| 2,699,648 | 7/1955 | Berkey | 60/756 |
| 3,777,484 | 12/1973 | Dibelius et al. | 60/757 |
| 4,162,611 | 7/1979 | Caruel et al. | 481/352 |
| 4,497,170 | 2/1985 | Elliot et al. | 60/39.23 |
| 4,545,196 | 10/1985 | Mongia et al. | 60/39.23 |

FOREIGN PATENT DOCUMENTS

| | | |
|---|---|---|
| 2194881 | 7/1973 | France . |
| 2505401 | 5/1982 | France . |
| 2572463 | 10/1984 | France . |
| 663639 | 12/1951 | United Kingdom . |
| 682778 | 11/1952 | United Kingdom . |
| 1572336 | 7/1980 | United Kingdom . |
| 2085147 | 4/1982 | United Kingdom . |
| 2134243 | 8/1984 | United Kingdom . |

Primary Examiner—Louis J. Casaregola
Attorney, Agent, or Firm—Bacon & Thomas

[57] ABSTRACT

A fuel system for a turbojet engine is disclosed in which the operating parameters of the engine are improved throughout the range of engine operating conditions. The fuel system includes an enlarged intermediate bowl for the combustion chamber which increases the reactive volume, while at the same time provides sufficient cooling of the bowl to avoid burn-through or uneven engine operating characteristics. The bowl extends radially outwardly beyond an opening in the base of the combustion chamber and defines a row of air inlet orifices which serves to more completely atomize the fuel prior to its ignition. A diaphragm control system may also be utilized to control the amount of air flowing into the bowl as the engine speed changes.

10 Claims, 5 Drawing Sheets

ENLARGED BOWL MEMBER FOR A TURBOJET ENGINE COMBUSTION CHAMBER

BACKGROUND OF THE INVENTION

This invention relates to improved means for mixing the fuel and primary air suppy in a turbojet engine combustion chamber, particularly enlarged bowl member which enhances the burning of the fuel over a wide range of operating parameters.

Conventional combustion chambers, as a rule, are divided into two zones to assure proper stability and efficiency over a wide range of operating parameters. They typically include a primary zone fed with a portion of very rich primary air, and a dilution zone, which is fed by the remaining air flow to cool the gases issuing from the primary zone and to adjust the temperature distribution of the gases at the outlet of the combustion chamber to minimize turbine wear.

The air flow injected into the primary zone is usually a compromise between the requirements of full power operation (i.e. minimal smoke emission, chamber wall thermal strength, etc.) and the requirements during idling (i.e. flame stability and adequate efficiency). This compromise has become increasingly difficult to achieve with more modern engine combustion chambers, due to more rigorous pollution standards, the decrease in the size of the combustion chambers, and the need for the engine to run on a wider variety of fuels.

One attempt to overcome the problems presented by the aforementioned compromise has been the creation of two-module combustion chambers. One of the modules is designed for slow engine speed operation, while the other is designed for full power operation. However, this type of chamber also has its drawbacks, since it is heavy, costly to manufacture and creates regulation problems at engine speeds intermediate the idle and full power conditions.

Another attempt at solution has been to design variable-geometry injection systems in which moving baffles allow varied diaphragm action of the combustion air chamber air intakes. A substantial reduction in the combustion volume, and, hence, of the combustion chamber bulk is obtained by continuously optimizing the operation of the combustion chamber. A typical example of such a variable geometry injection system can be found in U.S. Ser. No. 792,685 to Barbier et al, filed on Oct. 29, 1985 and entitled "Variable Flow Air-Fuel Mixing Device for a Turbojet Engine" (corresponding to French Patent Application No. 2,572,463).

This type of chamber typically makes use of aerodynamic fuel injectors with intermediate bowls of the type described in U.S. Pat. No. 4,162,611 to Caruel et al. As described in this patent, the injectors are mounted on the base of the combustion chamber with an intermediate part, referred to as the bowl, extending between the fuel injector and the combustion chamber base. The intermediate bowl has a frusto-conical rim which flares outwardly in the downstream direction and is perforated by a plurality of small diameter holes through which high-speed air enters the cone of atomized fuel. The bowl enhances the fuel injection function by producing turbulence which improves the fuel atomization and its mixing with the intake air.

Research on the low-speed stability of combustion chambers with intermediate bowls, with or without variable geometry intakes, has revealed that the stability of the flame in the chamber can be improved by increasing the low-speed reactive volume of the chamber and by an improved homogenization of the fuel atomized in the primary zone. During engine idle, the flow of the injected fuel into the combustion chamber is relatively slight and the reactive volume is more confined toward the base of the combustion chamber. Therefore, the increase in the reactive volume can only take place by widening the diameter of the intermediate bowl.

However, such a widening of the diameter of the bowl increases the dwell time of the fuel within the bowl, thereby incurring the danger of self-ignition of the fuel under those operational conditions in which the pressure and temperature upstream of the combustion chamber are relatively high. This danger poses a problem for future aircraft engines in which the compression ratio will be greater than those engines currently in production. The self-ignition of the fuel may cause burns in the intermediate bowl which degrade combustion chamber operation, and require more frequent maintenance thereby increasing the engine shut-down time.

SUMMARY OF THE INVENTION

It is an object of the present invention to provide an enlarged intermediate bowl for a combustion chamber which increases the reactive volume, while at the same time provides sufficient cooling of the intermediate bowl to prevent the problems noted above.

It is a further object of the invention to improve the idle operation of combustion chambers formed in this manner, whether with fixed or variable intake geometry, by increasing the diameter of the recirculation zone without causing the intermediate bowl to unduly overheat in spite of the increase in fuel dwell time.

Another object of the invention is to provide such a chamber with a widened intermediate bowl wherein a plurality of outlet holes for the atomization air are located on the intermediate bowl in a circular path having a diameter exceeding that of a circular opening in the combustion chamber base in which the intermediate bowl is mounted. The diameter of the opening in the base of the combustion chamber is limited by mechanical strength considerations of the base of the chamber.

The intermediate bowl according to the invention is utilized in a fuel injector system for a turbojet engine combustion chamber having at least one atomizing or pre-vaporizing type injector which, in turn, has at least one set of swirl vanes. In this system, the intermediate bowl is located between the outer periphery of the swirl vane assembly and the opening formed in the base of the combustion chamber.

The intermediate bowl according to this invention comprises an outer sleeve member which defines at least a first row of primary air inlet orifices and an inner sleeve which flares radially outwardly in a downstream direction and defines at least one row of air outlet orifices, the outer and inner sleeves having their ends attached to each other so as to define an intermediate chamber therebetween.

The inner sleeve flares radially outwardly in a downstream direction such that the air outlet orifices are located on a path having a diameter which exceeds that of the opening in the base of the combustion chamber. The longitudinal axes of the air outlet orifices extend inwardly such that they form an acute angle with an axis of the fuel injector downstream of the intermediate bowl.

When the bowl, according to the invention, is utilized in combination with a fuel injector wherein the injection is annular and radial, the inner sleeve of the bowl is simultaneously cooled by the impact of primary air passing through the outer sleeve into the intermediate chamber, and by the film of fuel passing along the downstream surface of the inner sleeve. The fuel passes along the inner surface of the inner sleeve and is atomized when contacted by the air passing through the atomizing air outlet orifices defined in the inner sleeve.

In a structural embodiment, the intermediate bowl of the invention further comprises an upstream collar having a generally "L" shaped cross-section affixed to the inner periphery of the opening defined in the combustion chamber base and a downstream collar, also having a generally "L" shaped cross-section in which the small leg of the "L" is attached to the upstream collar such that the longer leg of the "L" extends radially outwardly to form an annular plane which is substantially orthogonal to the axis of the fuel injector. The radially outer most end of the inner sleeve is attached to the downstream collar, while the radially outer end of the outer sleeve is attached to the upstream collar. The inner sleeve defines a cylindrical support portion which bears against the outer periphery of the swirl vane assembly. The outer sleeve also defines a cylindrical support portion which may rest on the inner sleeve.

The diameter and the number of atomizing air outlet orifices extending through the inner sleeve are calculated such that the air flow through these orifices is no greater than approximately 12% of the total air flow in the combustion chamber. The remaining approximately 88% of such air flow is emitted through intake orifices formed in the combustion chamber walls and through other intake orifices of the fuel injection system.

The outer sleeve may also define a second row of primary air inlet orifices. The first and second rows of such primary air inlet orifices formed in the outer sleeve are dimensioned and sized such that the second row admits approximately one-third of the air flow into the intermediate chamber, while the first row of inlet orifices admits the remaining two-thirds of the air into the intermediate chamber.

In an alternative embodiment of the invention, the first row of air inlet orifices defined by the outer sleeve may be controlled by a diaphragm mechanism so as to vary the area of the orifices depending upon the operational parameters of the engine. During engine idle, the diaphragm mechanism would completely close the first row of inlet orifices, while at full power operations, the first row of air inlet orifices would be fully opened. The diaphragm mechanism may be actuated by a linkage system connected to a nut and worm screw mechanism, or to a hydraulic jack mechanism mounted on the outer case of the combustion chamber.

BRIEF DESCRIPTION OF THE DRAWINGS

With reference to the attached figures, the following description illustrates, as examples, various embodiments of the apparatus in accordance with this invention.

DETAILED DESCRIPTION OF PREFERRED EMBODIMENTS

Figure 1:
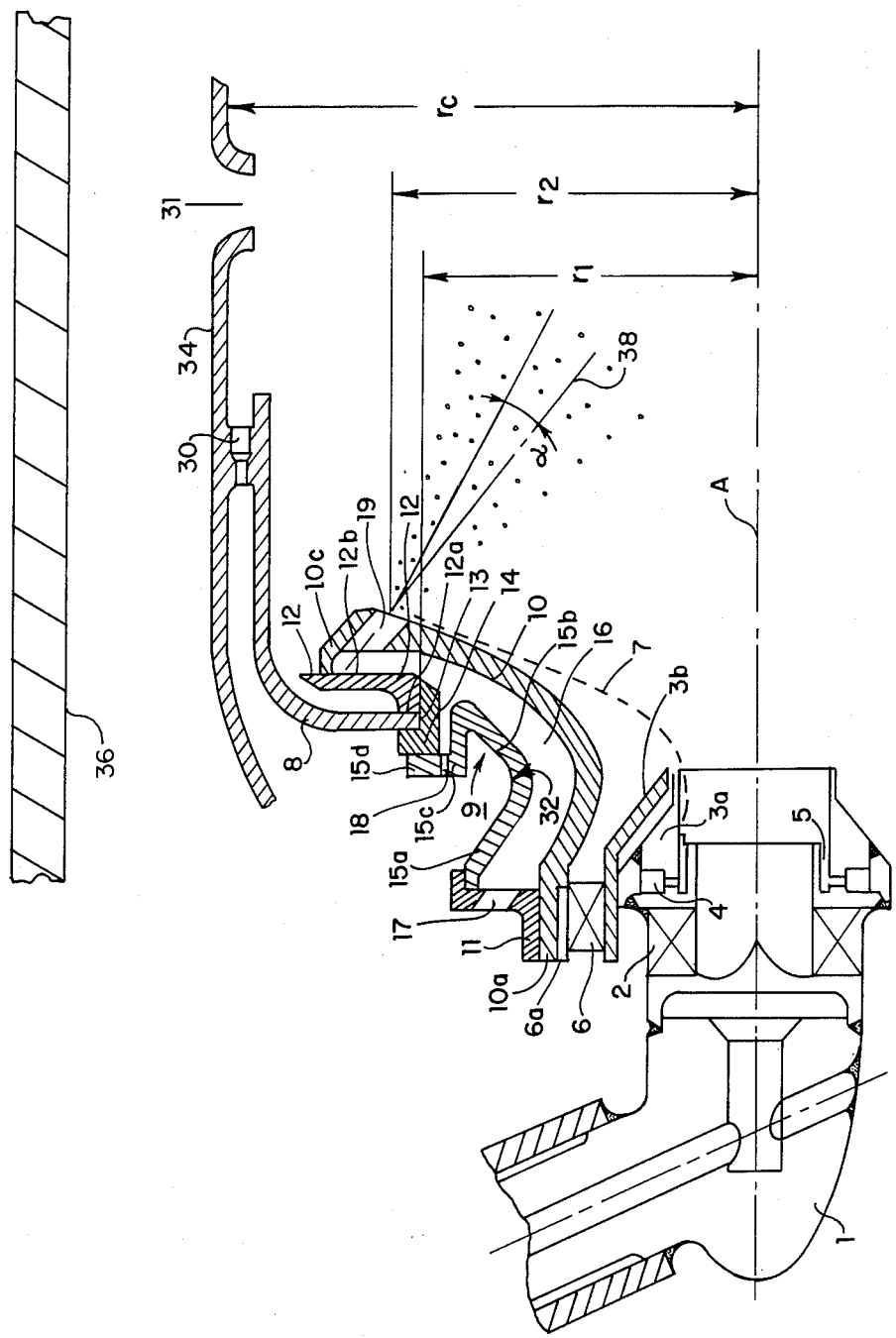
FIG. 1 is a partial, longitudinal sectional view of a first embodiment of the invention.

FIG. 1 shows a partial, longitudinal cross-section of a first embodiment of the invention. As is well known to those skilled in the art, the fuel injector assembly 1 injects fuel into a combustion chamber defined by wall 34, the fuel is mixed with air, supplied from a compressor (not shown) located at the upstream (to the left as seen in FIG. 1) side of the fuel injector assembly 1. The air supplied from the compressor passes into the combustion chamber through inner swirl vanes 2, outer swirl vanes 6, the intermediate bowl 9 and openings 30 and 31 formed in the wall of the combustion chamber. Air passing through the openings 31 comprises the primary combustion air, while air passing through openings 30 serves to cool the interior of the combustion chamber wall 34. An exterior housing 36 of the turbojet engine defines a passage between its interior and the wall 34 of the combustion chamber to allow passage of the air over the outside of the combustion chamber and into openings 31.

Inner swirl vanes 2 serve to impart a swirling movement to the air passing radially inwardly thereover so as to thoroughly mix the air with the fuel passing through the fuel injector assembly 1. An annular cap 3a, located downstream of the inner swirl vanes 2, is provided with internal ducts 4 which are supplied with fuel in known fashion and which are connected to the annular slot 5. Thus, fuel passes through the internal ducts 4 and the annular slot 5 and is mixed with the turbulent fuel/air mixture. The outer flow of the turbulent mixture is identified by dashed lines 7. Only the upper portion of the fuel/air mixture flow is shown in FIG. 1, and it can be seen that the flow expands radially outwardly in a downstream (toward the right) direction. Additional swirling movement is provided to this mixture by air passing through the outer swirl vanes 6 in a substantially axial direction. Outer swirl vanes 6 are attached about the periphery of annular cap 3b which is coaxial with the cap 3a. By combining the air patterns generated by the inner and outer swirl vanes, the fuel film issuing from slot 5 is centrifuged outwardly along a path defined by dashed line 7.

Bowl member 9 interconnects the fuel injector assembly 1, including swirl vanes 6 with the base 8 of the combustion chamber. The bowl member comprises an inner sleeve 10 having a first cylindrical support portion 10a oriented coaxially with the external support 6a of the outer swirl vanes 6. Cylindrical support portion 10a is externally threaded so as to receive ring 11 in threaded engagement therewith. The inner sleeve 10 extends radially outwardly in a downstream direction (toward the right as seen in FIG. 1) and defines a periphery 10c which is connected to downstream collar 12. Downstream collar 12 has a generally "L" cross-section with a smaller leg 12a being connected, such as by welding, to the base 8 adjacent an opening 13 therethrough. An upstream collar 14, also having a generally "L" shaped cross-section is attached to the base 8 so as to extend through opening 13. The shorter arm of the upstream collar 14 is fastened, such as by welding, to an upstream portion of the base 8 adjacent opening 13 such that the longer arm of the "L" extends through the opening and is adjacent shorter leg 12a of downstream collar 12. The longer leg 12b of the downstream collar 12 extends generally radially outwardly of opening 13 and defines a plane annular extension extending generally orthogonal to the injector axis A. The peripheral portion 12c of the downstream collar 12 is attached to the periphery 10c of the inner sleeve 10.

The intermediate bowl 9 also comprises an outer sleeve 15 which extends between the cylindrical support portion 10a of the inner sleeve 10 and the upstream collar 14. In the embodiment shown in FIG. 1, the outer sleeve 15 comprises an upstream portion 15a which is fastened to ring 11. A second portion 15b is welded to section 15a at 32 and flares radially outwardly in a downstream direction as shown. A cylindrical support portion 15c, extending in an upstream direction, extends between portion 15b and an annular flange portion 15d which, in turn, is attached to upstream collar 14.

Ring 11, having a double "L" shaped cross-section is threadingly engaged with cylindrical portion 10a of inner sleeve 10, as noted above, and is attached to upstream portion 15a, such as by welding. The outer sleeve 15, along with inner sleeve 10, ring 11 upstream collar 14 and downstream collar 12 define an intermediate chamber 16. Chamber 16 is supplied with upstream air entering through a first row of orifices 17, defined in the median part of ring member 11. This chamber is also supplied with air passing through a second row of orifices 18 defined by annular flange portion 15d of the outer sleeve 15. The diameters of the orifices 18 are smaller than those of the first row of orifices 17. The air passing through the row of orifices 18 serves to ventilate that portion of the inner sleeve 10 which extends furtherest away from the axis A.

The inner sleeve 10 defines a plurality of atomizing air outlet orifices 19 adjacent its outer periphery 10c. The orifices 19 are located as close as possible to the periphery 10c of the inner sleeve 10. The air outlet orifices 19 should also be distributed along a circular path having a radius greater than the radius of opening 13 formed in the base 8 of the combustion chamber. As illustrated in FIG. 1, the radius of the circular path of the orifices, $r_2$, measured at the downstream side at the longitudinal axis is greater than the radius $r_1$ of opening 13. Where the invention is utilized in conjunction with a tubular combustion chamber having a radius of $r_c$, the radius $r_1$ may be approximately 0.6 $r_c$. In that case, radius $r_2$ should be between 0.7 and 0.8 the radius $r_c$ of the combustion chamber.

Figure 5:
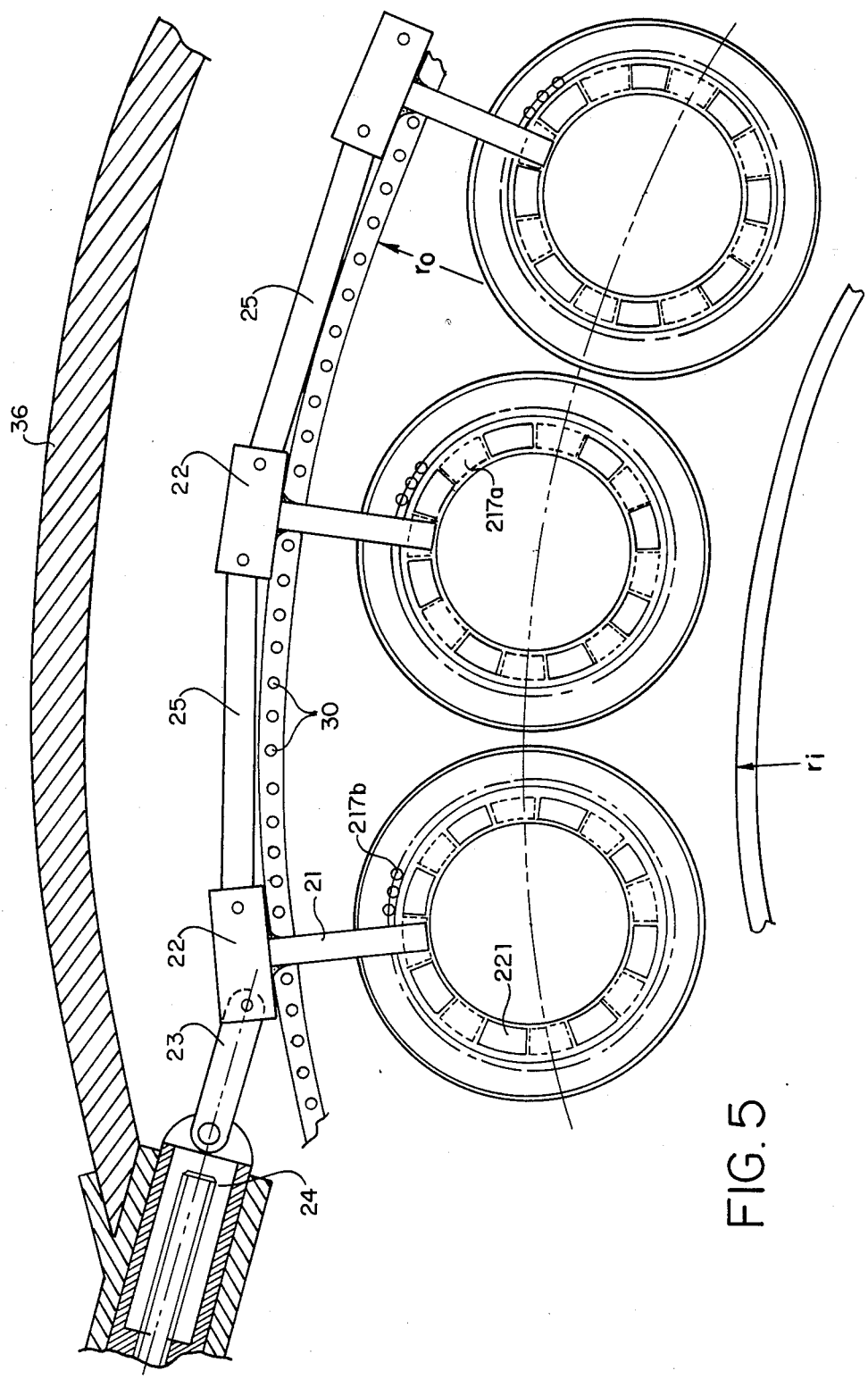
FIG. 5 is a partial, front sectional view showing the diaphragm control mechanism of the embodiment shown in FIG. 3.

If the invention is utilized in conjunction with an annular combustion chamber having an inner radius of $r_i$ and an outer radius of $r_o$, as illustrated in FIG. 5, radius $r_2$ should be between 0.7 and $0.8 \times [\frac{1}{2}(r_o - r_i)]$.

The atomizing air outlet orifices 19 each have a longitudinal axis 38 which cross the axis A at a location downstream from the bowl member 9 at an acute angle. A line tangent to the downstream surface of the inner sleeve 10 at the orifices 19 constitutes a generatrix of a cone having an apex angle of between 110° and 130°. The longitudinal axes 38 of the air outlet orifices 19 subtend an angle $\alpha$ with a line extending normal to the tangent line cone generatrix of between 20° and 30°. This structure allows a more thorough atomizing of the fuel film which passes at substantially right angles to the orifices 19 after its exit from the fuel injector 1 and passing along the downstream surface of inner sleeve 10 so as to cool this member.

The number and diameter of the air outlet orifices 19 are calculated in such a manner that these orifices deliver no more than approximately 12% of the air flowing into the combustion chamber. The remaining approximately 88% of the air is fed into the combustion chamber through primary orifices 31, cooling orifices 4, and through swirl vanes 2 and 6.

The aforedescribed structure serves to increase the reactive volume of the combustion chamber by increasing the atomization diameter of the fuel film, thereby improving the engine's idling performance. Any deleterious effects of the bowl member are avoided by providing the cooling air passing over its surface within intermediate chamber 16 and by cooling the downstream surface of the inner sleeve by the fuel film prior to its atomization.

Figure 2:
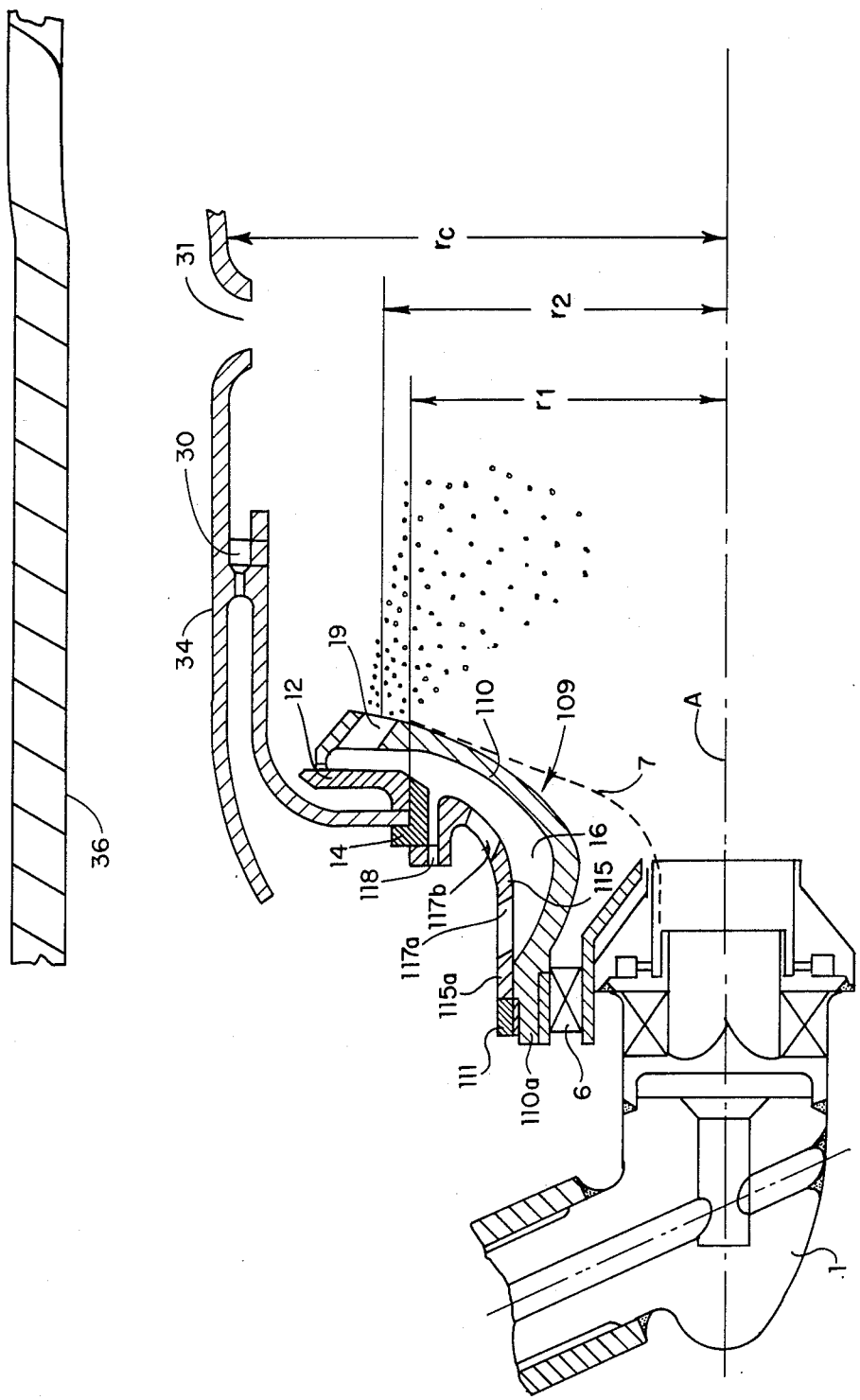
FIG. 2 is a partial, longitudinal sectional view of a second embodiment according to the invention.

FIG. 2 shows a second embodiment of the structure of the intermediate bowl 9. The parts having identical construction and function as those in FIG. 1 are identified with the same numerals. The parameter regarding the opening 13 formed in the base 8 of the combustion chamber and the location and orientation of the air outlet orifices 19 are the same as for the embodiment shown in FIG. 1. The intermediate bowl member 109 comprises inner sleeve 110, similar in shape to inner sleeve 10 shown in FIG. 1, having a cylindrical support portion 110a attached to swirl vane assembly 6. The radially outer most end portion 110c is attached to downstream collar 12 as in FIG. 1. In this embodiment, outer sleeve 115 has a cylindrical support portion 115a in direct contact with the outer diameter of the cylindrical support portion 110a of inner sleeve 110. Ring member 111 is a plane threaded ring which does not define the air intake orifices set forth in the previous embodiment shown in FIG. 1.

Instead, the air inlet orifices 117a and 117b are defined by outer sleeve 115. The main air inlet orifices 117a and 117b are arranged in two rows about the outer sleeve 115. The number and size of these main air inlet orifices are such that they allow for the passage of approximately two-thirds of the intake flow of air passing into intermediate chamber 16, while the third row of air inlet orifices 118 allow for the passing of the remaining approximately one-third of the air flow. The air passing through orifices 118 serves to ventilate the upstream collar 14 and the outer portion of inner collar 110.

Figure 3:
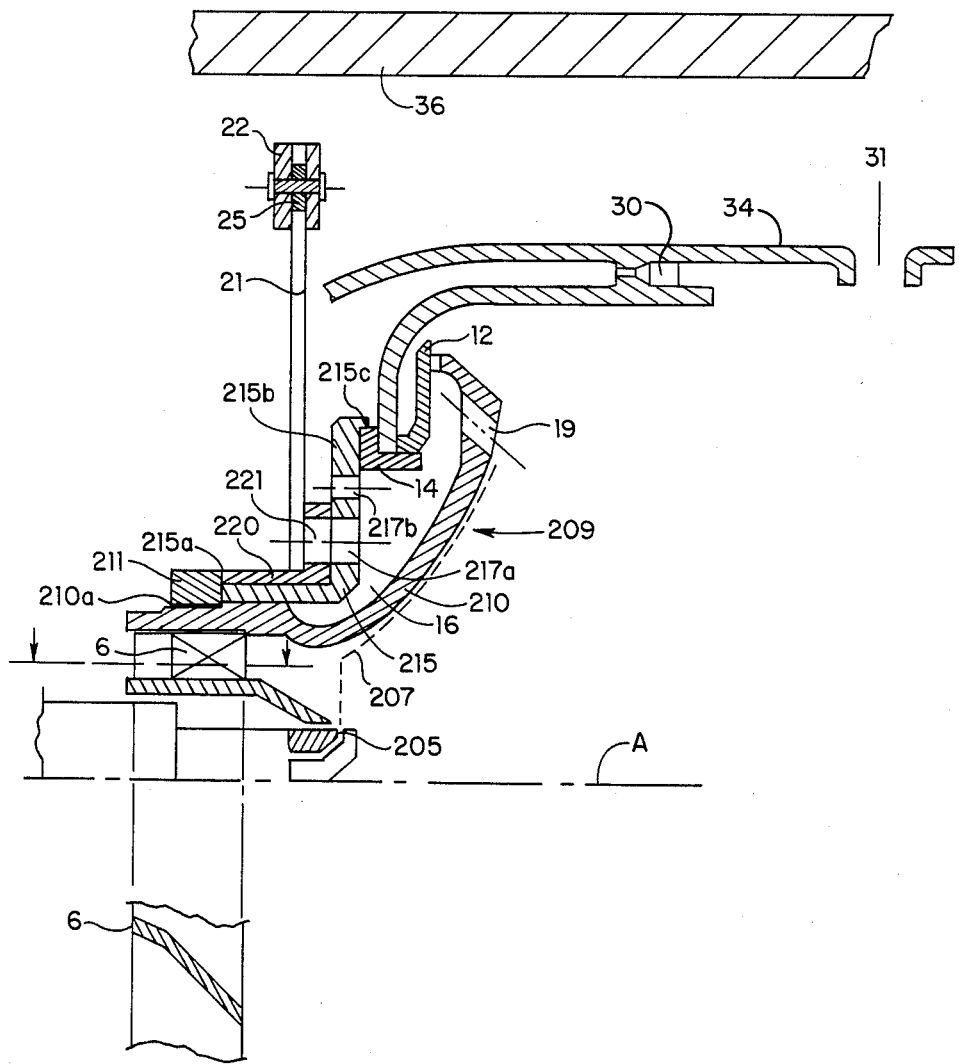
FIG. 3 is a partial, longitudinal sectional view of a third embodiment of the invention.

A third embodiment of the intermediate bowl member is shown at 209 in FIG. 3. Again, the interrelationship between the location and orientation of the air outlet orifices 19, and the opening 13 formed in the base 8 of the combustion chamber and the radius of the combustion chamber is the same as those for the embodiment of FIG. 1 discussed above. In this embodiment, however, the intermediate bowl member 209 is utilized in conjunction with a simplified fuel injector device having radial annular fuel injection through a slot 205 in known fashion. The fuel film, defined by dotted line 207, is forced against a downstream wall portion of inner sleeve 210 of the bowl member by the action of the air acting on the fuel after passing through swirl vanes 6.

Outer sleeve 215 defines a cylindrical support portion 215a which is coaxial with cylindrical support portion 210a of the inner sleeve 210 mounted on the periphery of swirl vanes 6. An annular portion 215b extends substantially orthogonal to the injector axis A and is attached at 215c to the upstream collar 14. Ring member 211 rigidly joins the inner sleeve 210 to the outer sleeve 215.

Air enters intermediate chamber 16 through two rows of primary air inlet orifices 217a and 217b formed in the annular portion 215b of the outer sleeve 215. The number and size of these orifices are computed such that orifices 217a admit approximately one-third of the inlet air flow to intermediate chamber 16, while orifices 217b serve to admit the remaining approximately two-thirds of the air flow into intermediate chamber 16.

In order to provide the optimal fuel richness conditions during all operating modes of the turbojet, the row of air inlet orifices 217a is controlled by a diaphragm mechanism. The diaphragm control mechanism comprises a diaphragm ring 220 rotatably attached to the cylindrical support portion 215a of the outer sleeve 215 between ring member 211 and the annular portion 215b. The diaphragm ring 220 define apertures 221 having the same dimensions and being of the same number as the orifices 217a formed in the outer sleeve 215. The diaphragm ring 220 is rotated by a lever 21 attached thereto and connected through a connector 22 to a link rod 23. Link rod 23, as shown in FIG. 5, may be connected to a displacement mechanism 24 which may comprise a hydraulic jack with an extensible piston rod, or a known nut and worm screw system. The displacement system 24 may be mounted on the outer casing 36 of the engine.

In a turbojet engine having an annular combustion chamber, several fuel injectors with adjacent intermediate bowl are located around the combustion chamber as shown in FIG. 5. The diaphragm control mechanisms of the adjacent bowl may be controlled by a single displacement system 24 by interconnecting the connectors 22 by a series of link rods 25. The rods extend around the periphery of the combustion chamber between the outer wall of the combustion chamber and the outer casing 36 of the engine. Movement of actuator mechanism 24 will serve to simultaneously open or close the diaphragm control mechanisms of all of the intermediate bowls.

Figure 4:
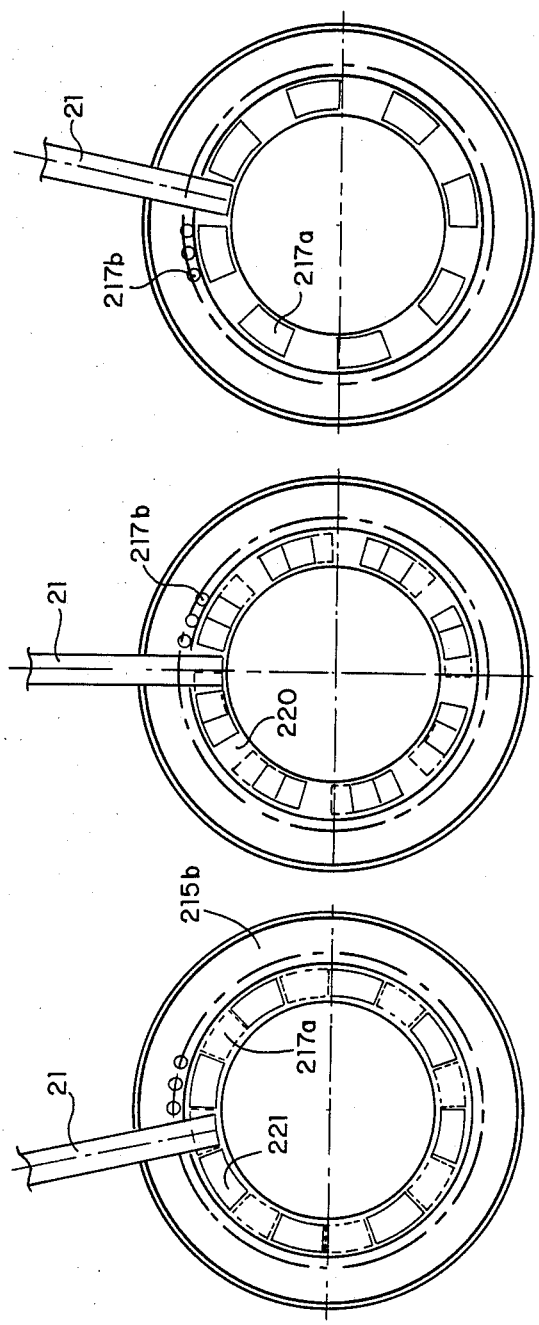
FIGS. 4a–4c are partial, front views of the embodiment shown in FIG. 3 showing the diaphragm control mechanism in an idle position (FIG. 4a), an intermediate position (FIG. 4b) and a full-power position (FIG. 4c).

FIG. 4 shows the relationships between the apertures formed in the diaphragm control ring 220 and the air inlet orifices 217a. In FIG. 4a, which reflects idling conditions of the engine, the apertures 221 are completely displaced from the orifices 217a so as to keep the orifices completely closed. Under these conditions, the flow of atomizing inlet air passing through the orifices 19 in the intermediate bowl member is no greater than approximately 4% of the total air flow in the combustion chamber.

During the full power operation of the engine, as shown in FIG. 4c, the apertures 221 are completely aligned with the orifices 217b to allow the maximum amount of air flow therethrough. At this position, the air flow passing through the orifices 19 of the intermediate bowl is approximately 12% of the total flow in the combustion chamber. Between these two extreme positions, the air flow may be continuously varied utilizing the control device 24 connected to the control lever 21. When the diaphragm ring 220 is half open the flow through the orifices 19 in the intermediate bowl should be approximately 8% of the total flow through the combustion chamber.

By using the diaphragm control ring 220 to vary the atomizing air flow to obtain an optimal fuel mixture at all modes of operation, and by increasing the effective combustion volume due to the widening of the diameter of the air atomizing inlet orifices 19, improved stability is obtained during the slower engine modes, and improved atomizing and fuel distribution are obtained under all operating conditions of the combustion chamber.

The injection system incorporating the enlarged intermediate bowl furthermore allows improved thermal resistance of the injection system at the inner wall of the bowl near the axis of the chamber which is cooled by the liquid or gaseous fuel issuing from the injector. It also improves the cooling of the intermediate bowl near the upstream collar 14 due to air passing through the bowl orifices 18, 118 and 218 into the intermediate chamber 16. Furthermore, the periphery of the inner sleeve is cooled by the air passing through outlet orifices 19. Further cooling air openings may be provided in the periphery of the inner sleeve adjacent the downstream collar 12 to further assist in cooling the base portion of the combustion chamber.

The foregoing descriptions are provided for illustrative purposes only and should not be construed as in any way limiting this invention, the scope of which is defined solely by the appended claims.

What is claimed is:

1. An enlarged bowl member for a turbojet engine having a combustion chamber with a longitudinal axis and an upstream base of the combustion chamber defining at least one opening with a radius $r_1$, to accommodate fuel injection means to inject fuel into the combustion chamber comprising:
   (a) an inner sleeve having an upstream end portion attached to the fuel injection means and a downstream end portion attached to the combustion chamber base, the inner sleeve flaring radially outwardly from the axis in a downstream direction, and defining at least one row of atomizing air outlet orifices adjacent the downstream end, the outlet orifices being distributed along a circular path around the fuel injection means having a radius $r_2$ such that $r_2 > r_1$ and oriented such that each of their central axes subtends an angle ($\alpha$) of between 20° and 30° with respect to a line extending normal to a line tangent to a downstream surface of the inner sleeve at the outlet orifice; and,
   (b) an outer sleeve having an upstream end portion attached to the inner sleeve and a downstream end portion attached to the combustion chamber base so as to define an intermediary air chamber between the inner and outer sleeves, and defining at least one row of air inlet orifices.

2. The enlarged bowl member according to claim 1 wherein the combustion chamber is annular in shape having an inner radius ($r_i$) and an outer radius ($r_o$) and wherein the atomizing air outlet orifices are distributed along a circular path around the fuel injection means having a radius $r_2$ wherein $r_2$ has a length approximately equal to between $$0.7\left(\frac{r_o - r_i}{2}\right) \text{ and } 0.8\left(\frac{r_o - r_i}{2}\right).$$

3. The enlarged bowl member according to claim 1 wherein the inner sleeve is flared radially outwardly such that a line tangent to a downstream surface of the sleeve at the air outlet orifices constitutes the generatrix of a cone having an apex angle between 110° and 130°.

4. The enlarged bowl member according to claim 1 wherein the number and size of air outlet orifices permit a maximum air flow therethrough of aproximately 12% of the total air flow into the combustion chamber.

5. The enlarged bowl member according to claim 4 wherein the outer sleeve defines a second row of air inlet orifices adjacent to its downstream end portion, wherein the number and size of the air inlets in the first row permit a maximum of approximately two-thirds of the total air flow into the intermediary air chamber.

6. The enlarged bowl member according to claim 5 further comprising control means to selectively open or close the first row of air inlet orifices.

7. The enlarged bowl member according to claim 6 wherein the control means comprises:
 (a) a diaphragm ring rotatably attached to the outer sleeve, the diaphragm ring defining a plurality of apertures, each aperture being approximately the same size as the air inlet orifices in the first row, the diaphragm being movable between a first extreme position wherein the apertures are out of alignment with the first air inlet orifices to prevent air flow therethrough, and a second extreme position wherein the apertures are aligned with the first air inlet orifices to permit a maximum amount of air flow therethrough; and,
 (b) actuating means to move the diaphragm ring between the first and second extreme positions.

8. The enlarged bowl member according to claim 7 wherein the actuating means comprises:
 (a) a control lever having a first end attached to the diaphragm ring; and,
 (b) jack means attached to a second end of the lever.

9. The enlarged bowl member according to claim 8 further comprising link rods interconnecting control levers of adjacent diaphragm rings.

10. The enlarged bowl member according to claim 1 wherein the combustion chamber is tubular and has a radius $r_c$, and wherein the atomizing air outlet orifices are distributed along a circular path having a radius $r_2$ such that $r_2$ equals between $0.7 r_c$ and $0.8 r_c$.

* * * * *